(12) United States Patent
Brouard et al.

(10) Patent No.: US 6,828,979 B2
(45) Date of Patent: Dec. 7, 2004

(54) METHOD AND DEVICE FOR VIDEO SCENE COMPOSITION INCLUDING MAPPING GRAPHIC ELEMENTS ON UPSCALED VIDEO FRAMES

(75) Inventors: Guillaume Brouard, Paris (FR); Thierry Durandy, Issy les Moulineaux (FR); Thierry Planterose, Paris (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 420 days.

(21) Appl. No.: 10/144,821

(22) Filed: Oct. 25, 2001

(65) Prior Publication Data

US 2002/0163501 A1 Nov. 7, 2002

(30) Foreign Application Priority Data

Oct. 31, 2000 (EP) .............................................. 00403027

(51) Int. Cl.7 ............................ G09G 5/00; G06T 15/00
(52) U.S. Cl. ........................ 345/581; 345/156; 345/419
(58) Field of Search .............................. 348/580–581, 348/471; 386/131, 68; 725/44, 139, 240.08, 240.21; 434/118; 382/298–299; 345/581–582, 426, 156, 600, 583, 503, 589; 375/240

(56) References Cited

U.S. PATENT DOCUMENTS 5,264,933 A * 11/1993 Rosser et al. ................ 348/578
6,525,746 B1 * 2/2003 Lau et al. .................... 345/725

2001/0017671 A1 * 8/2001 Pleven et al. ................ 348/722

FOREIGN PATENT DOCUMENTS

| EP | 0407614 A1 | 1/1990 | ............ G09G/5/36 |
| WO | WO9806098 | 8/1997 | ......... G11B/27/031 |

OTHER PUBLICATIONS

"MPEG–R Authoring Tools Let Pros, Consumers Create Multimedia for Web Pages, TV, HDTV", XP002155140, p. 1, line 1–p. 1, line 40.

* cited by examiner

*Primary Examiner*—Matthew C. Bella
*Assistant Examiner*—Anthony Blackman

(57) ABSTRACT

This invention relates to a method and device for obtaining upscaled video frames including 2D graphic elements from primary video objects of smaller format, while ensuring no degradation of said 2D graphic elements will take place. To this end, separate and parallel processes are performed on video frames and on 2D graphic elements. The first process consists of generating rendered frames from said primary video objects, said rendered frames being afterwards upscaled to the desired output video format. The second process consists of directly rendering in said output format the 2D graphic elements by using a drawing algorithm ensuring no degradation of said 2D graphic elements will take place. In a final step, rendered 2D graphic elements are mapped on the upscaled video frames. Compared with an upscaling performed on video frames including 2D graphic elements which leads to upscaled video frames including degraded 2D graphic elements, this method yields upscaled video frames including 2D graphic elements of good resolution.

10 Claims, 3 Drawing Sheets

METHOD AND DEVICE FOR VIDEO SCENE COMPOSITION INCLUDING MAPPING GRAPHIC ELEMENTS ON UPSCALED VIDEO FRAMES

The present invention relates to a method of video scene composition from a set of graphic elements and primary video objects.

This invention may be used in any video coding system for improving, for a viewer, the visual reading comfort of graphic elements.

With the emergence of multimedia applications such as interactive television or the Electronic Program Guide (EPG), image quality has become an important aspect. Indeed, having simultaneously a good resolution and a large display format of pictures, videos and graphic elements is now required by end users so that they can communicate and interact with such applications while having a maximum visual comfort. More and more, the content of such multimedia applications is composed of a primary video content into which additional information is inserted. Such additional information may correspond to answers to end user requests or end-user graphic personalization resulting in the mapping of two-dimensional (2D) graphic elements in video frames of said primary video content, such as text or geometric patterns.

U.S. Pat. No. 5,877,771 describes a method and apparatus for 2D texture mapping for providing a richer surface detail in a displayed frame. To this end, multi-resolutional texture data for a destination pixel in the frames of the primary video is super-sampled at horizontal and vertical screen space sampling rates based on the local rate of change in texture. If graphic elements are considered as texture, such a method can be used for the mapping of 2D graphic elements on video frames.

It is an object of the invention to propose an improved and cost-effective method of video scene composition from 2D graphic elements and video objects which allows obtaining a good quality of said 2D graphic elements in the video scene.

Indeed, the prior art method has strong limitations. First, this method does not take into account that the mapping of 2D graphic elements on the primary video frames must be combined with an upscaling of said primary video frames if a larger format is required for the resulting output video frames. Thus, in this context, the quality of 2D graphic elements may be degraded because of aliasing, which results in coarse and jagged symbols not legible to viewers. Secondly, this method remains expensive since it requires a large amount of processing power for the mapping operation.

The method according to the invention provides a solution to the problems posed by the limitations of the prior art method. This method renders it possible to obtain upscaled video frames including 2D graphic elements from primary video objects of smaller format while ensuring that no degradation of said 2D graphic elements will take place. To this end, the method according to the invention is characterized in that it comprises:

a rendering step of said primary video objects for providing rendered video frames in a first format, an upscaling step of said rendered video frames for providing upscaled video frames in a second format, a rendering step of graphic elements for providing rendered graphic elements in said second format, a mapping step of said rendered graphic elements on said upscaled video frames, for composing frames defining the video scene.

This method profits the fact that the output video is composed of two sets of distinct data relating to video objects and 2D graphic elements. Thus, separate and parallel processes are performed on video objects and on 2D graphic elements. The first process consists of composing frames from video object frames, said frames being upscaled to the desired output video format afterwards. The second process consists in directly rendering the 2D graphic elements in said output format, using a drawing algorithm which ensures that no degradation of said 2D graphic elements will take place. In a final step, rendered 2D graphic elements are mapped on the upscaled video frames. This method generates upscaled video frames including 2D graphic elements of good resolution as compared with an upscaling performed on video frames including 2D graphic elements, which leads to upscaled video frames including degraded 2D graphic elements.

The invention will now be explained in more detail with reference to the embodiments described below and considered in connection with the accompanying drawings, in which identical parts or sub-steps have the same reference numbers:

The present invention relates to an improved video scene composition method from a set of video data and 2D graphic elements.

The invention is described for a video scene composed from 2D graphic elements and video data coded in accordance with the MPEG-4 video standard, but it will be apparent to those skilled in the art that the scope of the invention is not limited to this specific case but can also be applied to video data coded in accordance with other object-oriented video standards, MPEG-2 or H.263 video standards, or to non-coded video data.

Figure 1:
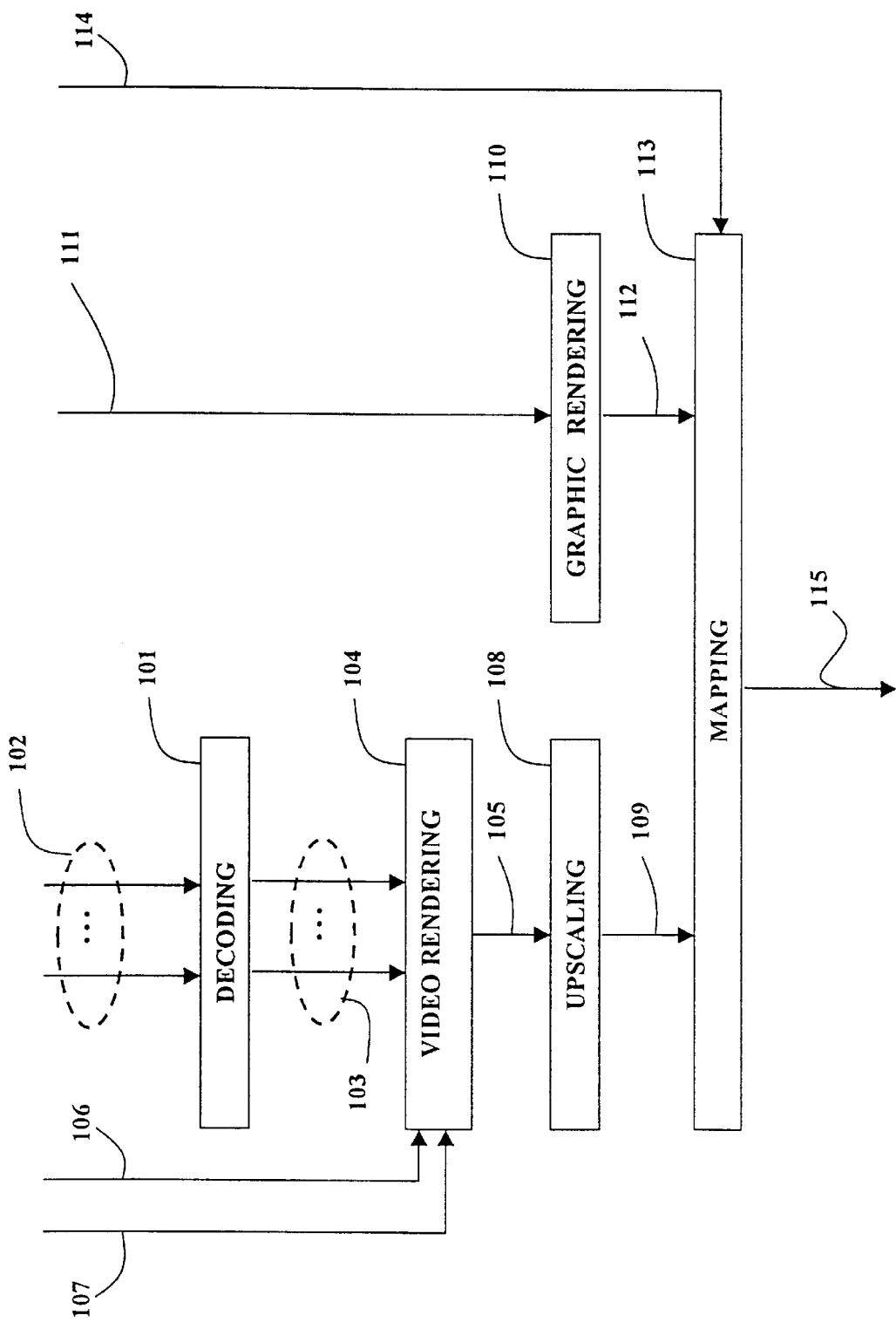
FIG. 1 depicts the sequence of steps according to the invention.

FIG. 1 depicts the sequence of steps of the method according to the invention in the context of a video scene composition from two videos and 2D graphic elements. It includes:

a decoding step 101 for decoding input video objects 102 coded in accordance with the MPEG-4 video standard and-for providing decoded video objects 103. The first video object corresponds to a background video having a first format, for example CIF format (Common Intermediate Format). The second video object corresponds to a video having a smaller format, for example a SQCIF format (Sub Quarter Common Intermediate Format). These input video objects are decoded by separate MPEG-4 decoders.

a video rendering step 104 for obtaining rendered video frames 105 from decoded videos 103. This step consists in assembling said videos 103 with respect to assembling parameters. For example, it may result in SQCIF video frames overlaid in CIF video frames. Such parameters describe, for example, the spatial position of each video object in the scene or the transparency coefficient between SQCIF and CIF video frames. They are directly extracted from each video object or from a stream 106 encoded in accordance with the BIFS syntax (Binary Format For Scene) and dedicated to describing the scene composition. This step may also take into account the ability of the MPEG-4 layer to modify assembling parameters in response to user interaction, e.g. by means of a mouse or a keyboard signal 107 or using BIFS updates inside the BIFS stream 106, such as changing of the spatial position of selected video objects in the scene being rendered.

an upscaling step 108 for providing enlarged rendered frames 109 along the horizontal and/or vertical axis. To this end, luminance and chrominance pixels of frames 105 are duplicated horizontally and/or vertically according to a scaling factor. Of course, alternative upscaling techniques may be used, such as techniques based on pixel interpolation. For example, if the scaling factor is set for two, the upscaling of frames 105 in the CIF format will result in frames 109 having the CCIR format.

a graphic rendering step 110 for obtaining 2D rendered graphic elements 112 from 2D graphic elements 111. To this end, a drawing algorithm is used to render said graphic elements 111 in a format allowing a direct mapping on frames 109, without upscaling. In this way no degradation of the 2D graphic elements can take place. The 2D graphic elements may be composed of text and/or graphic patterns. Each element 111 is rendered as a separate unit in the graphic rendering step 110.

a mapping step 113 of rendered 2D graphic elements 112 on rendered frames 109, resulting in frames 115. This step takes into account the position, defined by a signal 114 or the scene description inside the BIFS stream 106, of each 2D graphic element 112 in the frames 109, said position corresponding to horizontal and vertical coordinates in a cartesian reference system defined in frames 109. The signal 114 is pre-set or issued from a mouse or a keyboard, allowing a user to interact with 2D graphic elements in choosing their spatial position in said reference system. Once the position of a given graphic element is defined, the mapping operation 113 replaces pixels of frames 109 with pixels defining said graphic elements. In an improved embodiment, transparency between graphic elements and frames 109 can be obtained in achieving an average between pixels of frames 109 and the pixels defining said graphic elements.

Figure 2:
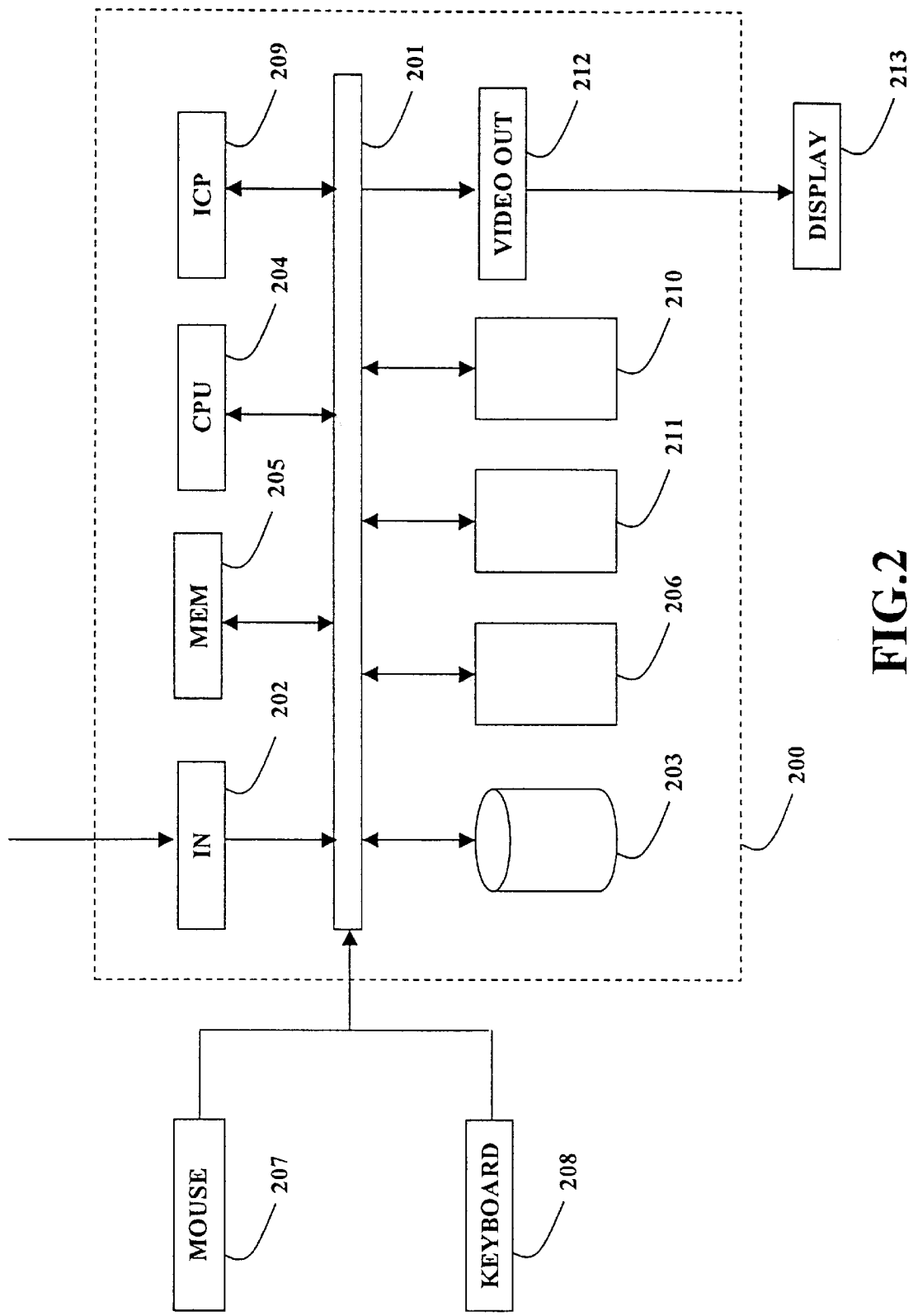
FIG. 2 depicts the hardware implementation of the invention.

FIG. 2 depicts the hardware architecture 200 for implementing the various steps according to the invention. This architecture is structured around a data bus 201 to ensure data exchange between the various processing hardware units. First, it includes an input peripheral 202 for receiving both input video objects and 2D graphic elements, which are both stored in the mass storage 203. Said video objects are decoded by the signal processor 204 (referred to as CPU in the figure), which executes instructions belonging to a decoding algorithm stored in the fast access memory 205. Once decoded, video objects are stored in a first video buffer 206. The video rendering step is also performed by the signal processor 204, executing instructions belonging to a rendering algorithm stored in the memory 205, but also taking into account data originating from the action of a mouse 207, a keyboard 208, a BIFS file stored in the mass storage 203, or a BIFS stream from the input peripheral 202 for positioning each video object in the video scene being built. Each frame rendered from a set of decoded video objects is thus stored in said first buffer 206 and is upscaled by means of a signal co-processor 209 (referred to as ICP in the Figure). The use of a signal co-processor for such a task allows a fast treatment and a minimum CPU occupation because upscaling hardware functions can be included in such a device. The resulting upscaled frame is stored in said buffer 206. In parallel, the 2D graphic elements are rendered by the signal processor 204, which executes instructions belonging to a drawing algorithm stored in the memory 205, each graphic element being successively rendered and successively mapped in the rendered frame contained in buffer 206. If transparency between rendered frames and 2D graphic elements is desired, rendered graphic elements are stored in a temporary buffer 210 so that an averaging operation between pixels belonging to the rendered frame stored in buffer 206 and pixels belonging to said rendered 2D graphic elements can be performed by the processor 204, the resulting frame being stored in buffer 206. When the final rendered frame including 2D graphic elements is available, the content of buffer 206 is sent to a second buffer 211 so that the final rendered frame is presented to an output video peripheral 212 for being displayed on a display 213. This switching mechanism allows the rendering of the next frame in the buffer 206 to start while the current frame in the buffer 211 is being displayed. This process is repeated for the rendering of each frame including 2D graphic elements.

Figure 3:
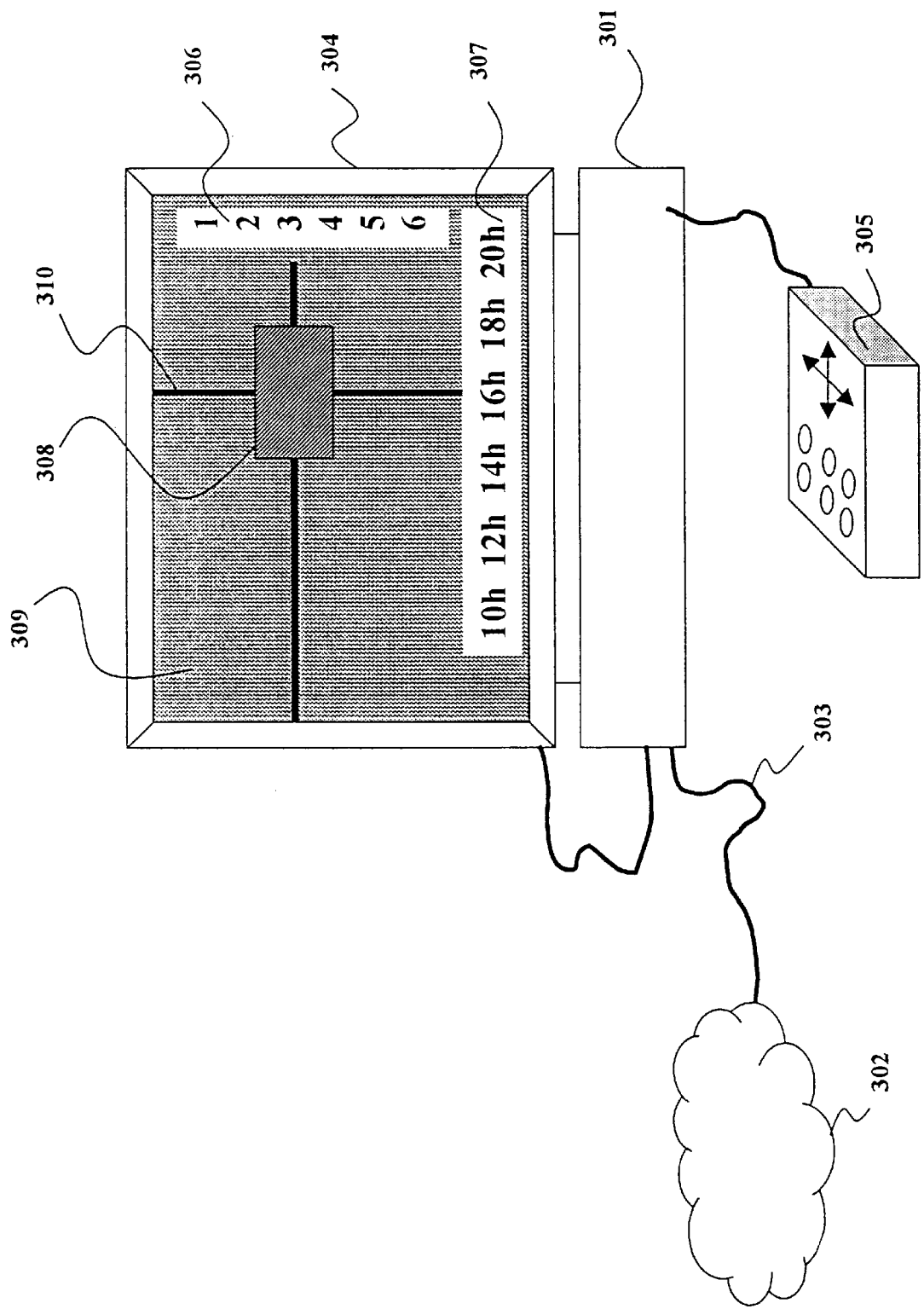
FIG. 3 depicts an embodiment of the invention.

FIG. 3 depicts an embodiment according to the invention. This embodiment corresponds to an electronic program guide application (EPG) allowing a user to receive a variety of information on TV channels programs, such as video previews or textual data. To this end, the consecutive steps according to the invention as described with reference to FIGS. 1 and 2 are implemented in a set-top box unit 301, which receives primary data from an outside world 302, e.g. from a broadcaster, via a link 303. Said primary data are processed in accordance with the different steps of the invention, resulting in video frames having a larger format than primary video objects, including 2D graphic elements, and displayed on the display 304. This application allows a user to navigate the screen and to see previews in dependence on the position of a browsing window 308 with its associated bar targets 310, in a channels space 306 and a time space 307. The browsing window 308 is overlaid and blended on top of the fullscreen TV program 309. Then the user can browse through time 307 and channels 306 while having the current TV program in the background. The interaction function is provided by the mouse-like pointer device 305, such as a multifunctional remote control. In this application, the invention ensures a good legibility of text and graphic elements 306, 307 and 310 in the displayed frames.

Of course, alternative graphic designs may be proposed for more informational features, such as the presentation of the actors of a movie, detailed information on programs, without deviating from the scope of the invention.

What is claimed is:

1. A method of video scene composition from a set of graphic elements and primary video objects, said method being characterized in that it comprises:

a rendering step of said primary video objects for providing rendered video frames in a first format, an upscaling step of said rendered video frames for providing upscaled video frames in a second format, a rendering step of graphic elements for providing rendered graphic elements in said second format, a mapping step of said rendered graphic elements on said upscaled video frames, for composing frames defining the video scene.

2. A method as claimed in claim 1, characterized in that the primary video objects are decoded MPEG-4 video objects.

3. A method as claimed in claim 1, characterized in that the graphic elements are characters and geometric patterns.

4. A method as claimed in claim 1, characterized in that the rendering step of graphic elements is done by a method using a drawing algorithm.

5. A method as claimed in claim 1, characterized in that the upscaling step involves a duplication of pixels which define rendered frames having the first format.

6. A set-top box product for video scene composition from a set of graphic elements and primary video objects, said set-top box being characterized in that it comprises:

rendering means applied to said primary video objects for providing rendered video frames in a first format, upscaling means applied to said rendered video frames for providing upscaled video frames in a second format, rendering means applied to said graphic elements for providing rendered graphic elements in said second format, mapping means for mapping said rendered graphic elements on said upscaled video frames, resulting in frames defining the video scene.

7. A set-top box product as claimed in claim 6, characterized in that the rendering and mapping means involve the execution of dedicated program instructions by a signal processor, said program instructions being loaded in said signal processor or in a memory, while upscaling means involve the execution of hardware functions of a signal co-processor.

8. A set-top box product as claimed in claim 6, characterized in that it comprises user-interaction means for modifying the relative spatial positions of said primary video objects during their rendering.

9. A set-top box product as claimed in claim 6, characterized in that it comprises decoding means for decoding an input MPEG-4 stream, resulting in MPEG-4 video objects defining said primary video objects.

10. A set-top box product as claimed in claim 6, characterized in that said graphic elements mapped on said upscaled video frames are characters and geometric patterns.

* * * * *